(12) United States Patent
Klinglesmith et al.

(10) Patent No.: US 12,189,544 B2
(45) Date of Patent: Jan. 7, 2025

(54) TRANSMITTING A RESPONSE WITH A REQUEST AND STATE INFORMATION ABOUT THE REQUEST

(71) Applicant: SiFive, Inc., San Mateo, CA (US)

(72) Inventors: Michael Klinglesmith, Chambéry (FR); Eric Andrew Gouldey, Fort Collins, CO (US); Wesley Waylon Terpstra, San Mateo, CA (US)

(73) Assignee: SiFive, Inc., Santa Clara, CA (US)

( * ) Notice: Subject to any disclaimer, the term of this patent is extended or adjusted under 35 U.S.C. 154(b) by 23 days.

(21) Appl. No.: 18/341,093

(22) Filed: Jun. 26, 2023

(65) Prior Publication Data

US 2024/0184720 A1    Jun. 6, 2024

Related U.S. Application Data

(60) Provisional application No. 63/429,392, filed on Dec. 1, 2022.

(51) Int. Cl.
| | | |
|---|---|---|
| *G06F 13/16* | (2006.01) | |
| *G06F 12/084* | (2016.01) | |
| *G06F 13/42* | (2006.01) | |

(52) U.S. Cl.
CPC ........ *G06F 13/1621* (2013.01); *G06F 12/084* (2013.01); *G06F 13/4234* (2013.01)

(58) Field of Classification Search
CPC . G06F 13/1621; G06F 13/4234; G06F 12/084
See application file for complete search history.

(56) References Cited

U.S. PATENT DOCUMENTS

| | | | | |
|---|---|---|---|---|
| 11,556,485 B1* | 1/2023 | Tong | ................... | G06F 12/0879 |
| 2006/0236038 A1* | 10/2006 | Hum | ................... | G06F 12/0813 |
| | | | | 711/144 |
| 2010/0153655 A1* | 6/2010 | Cypher | ............... | G06F 12/0855 |
| | | | | 711/139 |
| 2022/0232089 A1* | 7/2022 | Gokavarapu | ....... | H04L 67/1014 |

\* cited by examiner

*Primary Examiner* — Edward J Dudek, Jr.
(74) *Attorney, Agent, or Firm* — Kilpatrick Townsend & Stockton LLP

(57) ABSTRACT

First agent circuitry may receive from a second agent a first request and a first set of one or more bits. The first request may be part of a data operation. The first agent circuitry may transmit to the second agent a message including a first response to the first request, the first set of one or more bits, a second request, and a second set of one or more bits. The second set of one or more bits may be generated by the first agent circuitry to transmit state information about the second request. In some implementations, a set of one or more wires may be generated for transmission of the second set of one or more bits. The first agent circuitry may receive from the second agent a second response to the second request and the second set of one or more bits.

20 Claims, 8 Drawing Sheets

TRANSMITTING A RESPONSE WITH A REQUEST AND STATE INFORMATION ABOUT THE REQUEST

CROSS REFERENCE TO RELATED APPLICATION

This application claims priority to and the benefit of U.S. Provisional Patent Application Ser. No. 63/429,392 filed on Dec. 1, 2022, the entire disclosure of which is hereby incorporated by reference.

TECHNICAL FIELD

This disclosure relates generally to integrated circuits and, more specifically, to transmitting a response with a request and state information about the request.

BACKGROUND

A System-on-Chip (SoC) is an integrated circuit that includes multiple components connected to one another. The components may include, for example, processor cores, caches, cross bars, memory controllers, and memory-mapped devices. The components may be connected so that data can be transferred between them while adhering to a coherence policy, such as the MSI (modified, shared, invalid), MESI (modified, exclusive, shared, invalid), or MOESI (modified, owned, shared, exclusive, invalid) protocol. For example, the components can include agents that are connected to one another using TileLink, a chip-scale interconnect standard that provides multiple masters with coherent memory mapped access to memory and/or slave or server devices.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
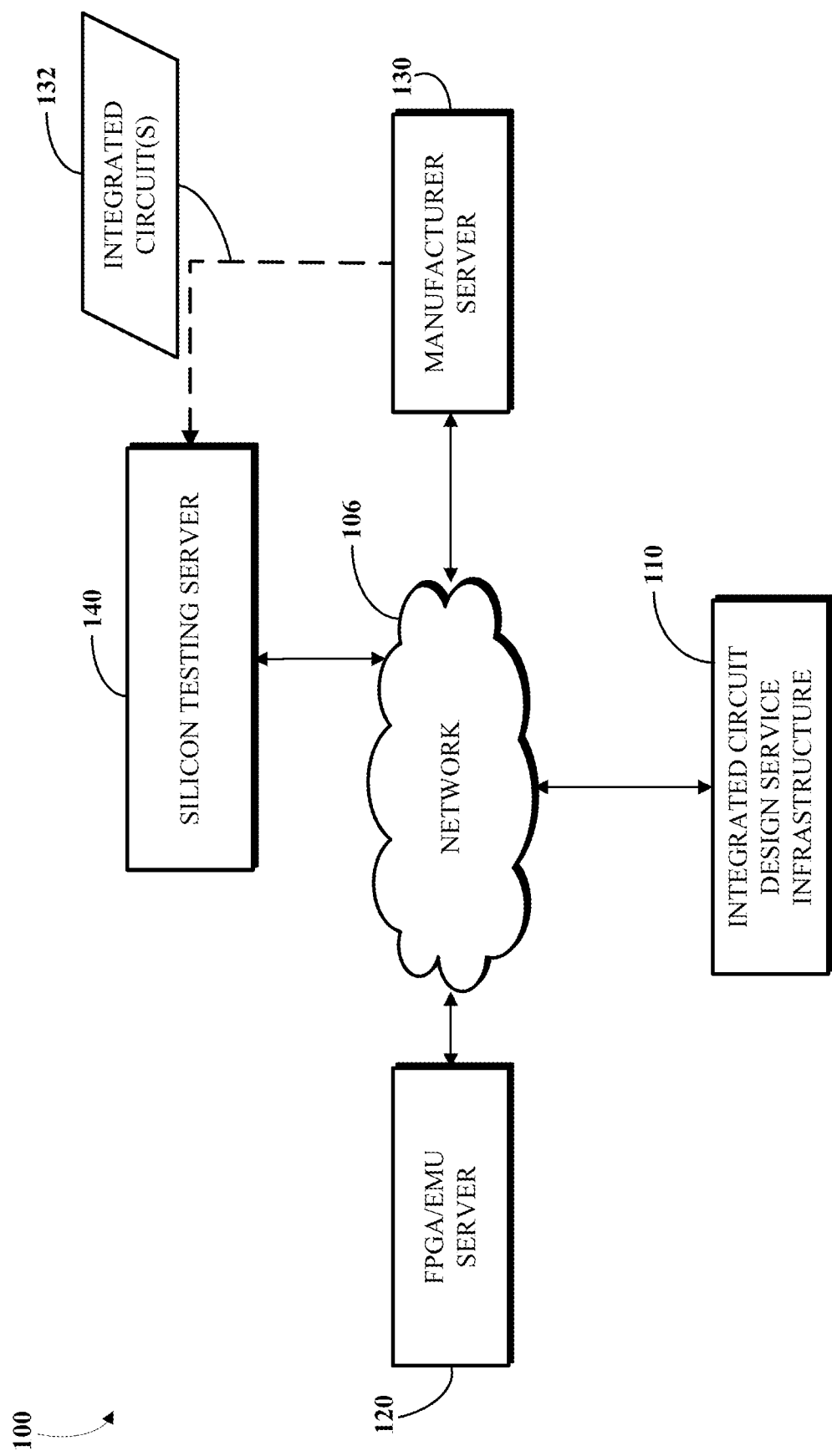
FIG. 1 is a block diagram of an example of a system for facilitating generation and manufacture of integrated circuits.

In an SoC, agents implemented by components, such as processor cores, caches, cross bars, memory controllers, and memory-mapped devices, may communicate with one another while adhering to a cache coherence policy (e.g., one of the MSI, MESI, or MOESI policies). For example, the agents may communicate with one another by initiating operations transmitted through a communications link, such as to acquire, probe, or release data stored in a cache block. A cache block is a contiguous set of memory addresses for which an agent can track cached copies of associated memory data. Thus, an agent may include logic that enables access to shared address space by communicating messages.

In some cases, a first agent that is an initiator of an operation might send bits for tracking information about a request being sent. For example, the first agent (e.g., a client agent, or master) could be an initiator of an Acquire operation for acquiring access to data stored in a cache block. The first agent could send an Acquire message requesting access to the cache block, along with bits for tracking information about the request. A second agent (e.g., a server agent, or slave) could receive the Acquire message and respond with a Grant message responding to the request, along with the bits for the first agent to track the information about the request. The first agent could then send a GrantAck message back to the second agent to acknowledge the response. While the first agent may receive the bits that it previously generated for tracking the information about the request, the second agent may not as the second agent is responding to the request. However, this ignores the fact that the second agent may also be a requesting agent in the operation. For example, when the second agent responds with the Grant message, the second agent is also requesting an acknowledgment from the first agent (e.g., an implicit request). For tracking information about the acknowledgment (e.g., the GrantAck message sent by the first agent), the second agent reference state information about the response that is kept locally (e.g., a data structure, which may include a score board with a table for tracking requests and responses). This may add complexity to the second agent, particularly when the second agent is transferring many messages between many agents in a system, such as when implemented by a cross bar.

Implementations of this disclosure are designed to improve the efficiency of managing messages between components (e.g., modules) in an SoC by enabling an agent that sends response messages and request messages (e.g., the Grant message) to also send a set of one or more bits (e.g., request echo bits, or annotations created in a field associated with the request message). The request echo bits may be used by an agent to send information to travel with the request message (e.g., the Grant message, which is both a response and a request for an acknowledgment) and its associated response message (e.g., the GrantAck message coming back), rather than the agent tracking outstanding request messages in a local state. This may permit the agent to avoid keeping the state locally (e.g., sizing a state storage locally, which may involve information to determine a correct concurrency based on the coherence policy) and avoid the complexity of managing associated storage. The set of one or more bits (e.g., the request echo bits) could be a second set of one or more bits, with a first set of one or more bits (e.g., response echo bits, or annotations created in a field associated with the response message) being sent by another agent that is the initiator of the operation. For example, the request echo bits and the response echo bits could be transmitted together through a link between the agents, such as through one or more channels of the link that carry response messages and request messages.

In some implementations, an integrated circuit generation process (e.g., for designing an integrated circuit, such as the SoC) may include a negotiation process (e.g., implemented by Diplomacy, a parameter negotiation framework for generating parameterized protocol implementations) that considers both request echo bits and response echo bits for generating wires specifically to transmit the request echo bits and the response echo bits. This may permit an agent to make a choice during the integrated circuit design process between: (1) the agent locally managing state information to track request messages, and (2) the agent moving the tracking to outside of the agent by using the echo bits to manage the state information. As a result, the complexity of an agent that sends response messages and request messages can be reduced so that the agents can operate more efficiently in the system.

To describe some implementations in greater detail, reference is first made to examples of hardware and software structures used to implement a system including components that may transmit a response with a request and state information about the request. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-6.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
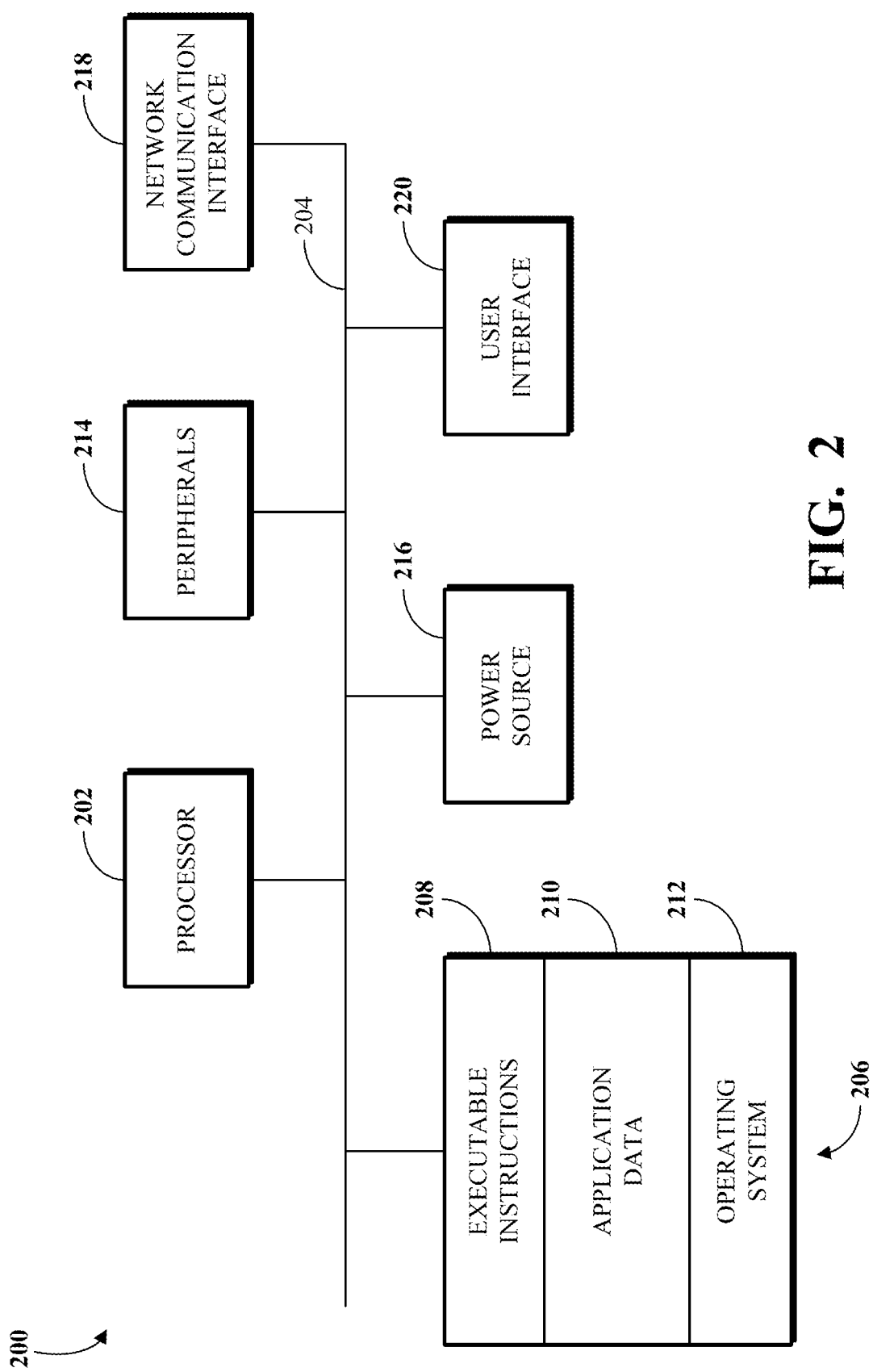
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-6.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
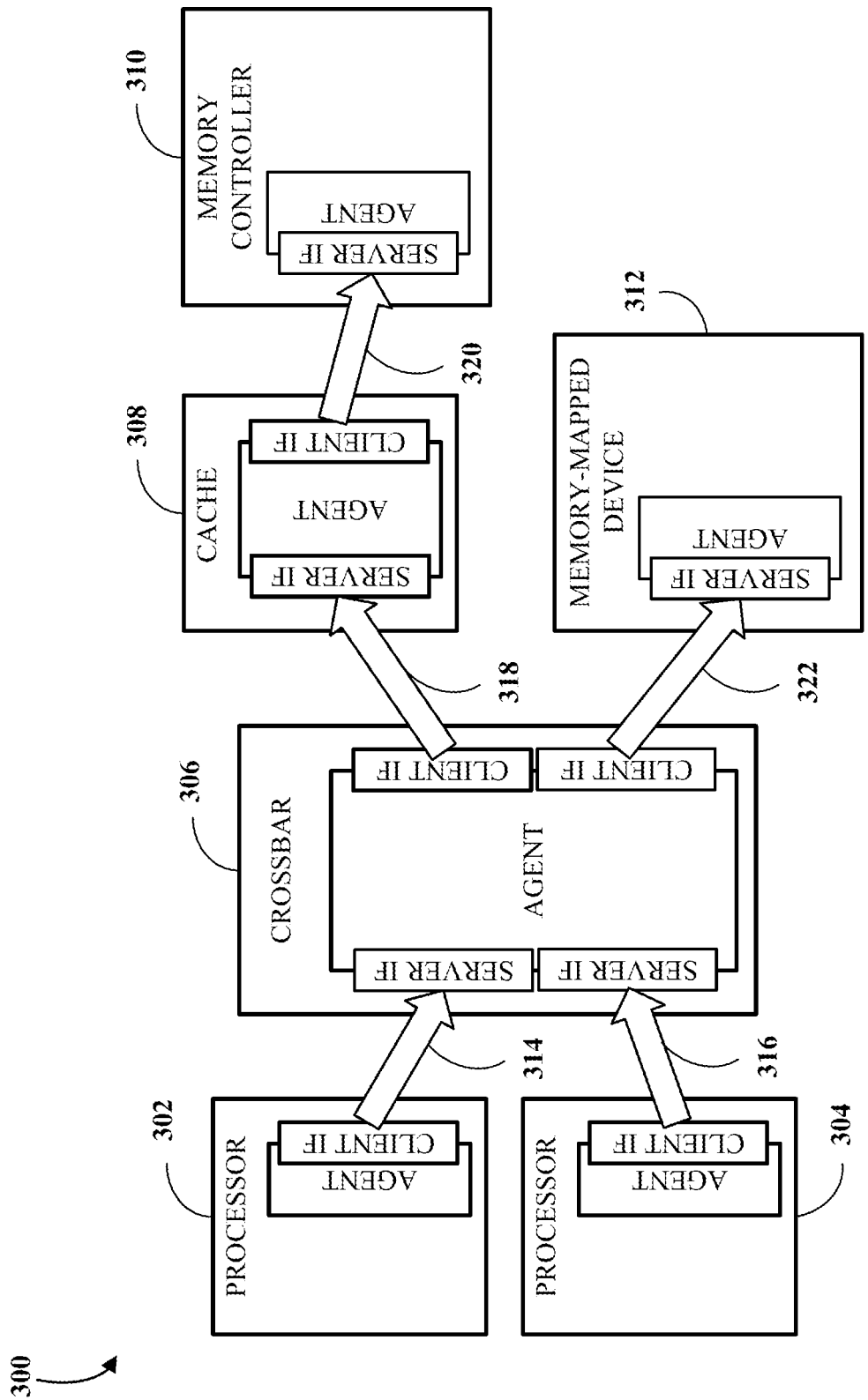
FIG. 3 is a block diagram of an example of a system including agents, implemented by components, that may transmit a response with a request and state information about the request.

FIG. 3 is a block diagram of an example of a system 300 including components that may transmit a response and a request with state information about the request. The system 300 could be implemented, for example, by an SoC. The components may include, for example, a first processor core 302, a second processor core 304, a cross bar 306, a cache 308 (e.g., a shared L2 cache, implementing a data storage such as an SRAM), a memory controller 310 (e.g., implementing a data storage such as a DRAM), and a memory-mapped device 312. The components may be connected so that data stored in cache blocks can be transferred between them while adhering to a cache coherence policy, such as one of the MSI, MESI, or MOESI policies. For example, the components can include agents that are connected to one another so that messages involving data can be transferred between them (e.g., sending and receiving) while adhering to the cache coherence policy. For example, the agents may be connected to one another using TileLink, a chip-scale interconnect standard that provides multiple masters with coherent memory mapped access to memory and/or slave or server devices.

The agents implemented by the components may implement point-to-point links for communicating the messages to one another. The messages may include, for example, requests (e.g., a request for data), responses (e.g., transferring the data), and acknowledgements. An agent may implement one or more master or client interfaces and/or one or more slave or server interfaces for communicating the messages. An agent with a client interface may request an agent with a server interface to perform memory operations, or may request permission to transfer and cache copies of data. An agent with a server interface may manage permissions and access to a range of addresses, including performing memory operations on behalf of requests arriving from a client interface. Thus, connected agents may send and receive messages over links to perform operations on shared address space.

For example, in the system 300, the first processor core 302 and the second processor core 304 may each include an agent having a client interface. The cross bar 306 may include an agent having a first server interface, a second server interface, a first client interface, and a second client interface (e.g., the cross bar 306 may be a server and a client, or a servent). The client interface of the first processor core 302 may connect to the first server interface of the cross bar 306 by a link 314. The client interface of the second processor core 304 may connect to the second server interface of the cross bar 306 by a link 316. The cache 308 may include an agent having a server interface and a client interface (e.g., the cache 308 may also be a servent). The first client interface of the cross bar 306 may connect to the server interface of the cache 308 by a link 318. The memory controller 310 may include an agent having a server interface. The client interface of the cache 308 may connect to the server interface of the memory controller 310 by a link 320. The memory-mapped device 312 may include an agent having a server interface. The second client interface of the cross bar 306 may connect to the server interface of the memory-mapped device 312 by a link 322. The agents implemented by the first processor core 302, the second processor core 304, the cross bar 306, the cache 308, the memory controller 310, and the memory-mapped device 312, may send and receive messages over their respective links, links 314, 316, 318, 320, and 322, to perform operations on shared address space.

Figure 4:
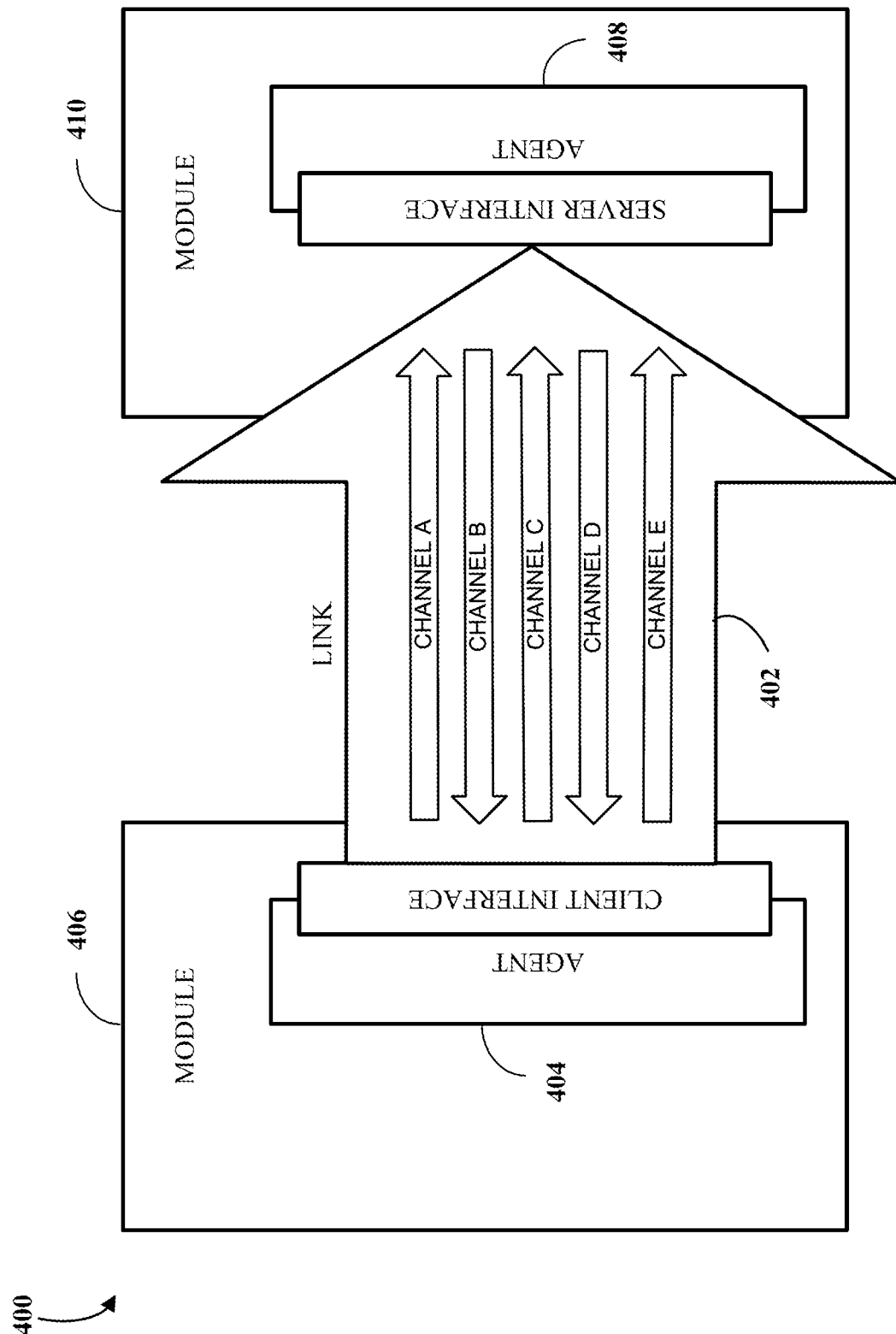
FIG. 4 is a block diagram of an example of a link between agents implemented by components.

FIG. 4 is a block diagram of an example of a link 402 between agents implemented by components in a system, such as between an agent 404 implemented by a first component 406 and an agent 408 implemented by second component 410. For example, the link 402 could be one of the links, 314, 316, 318, 320, or 322, shown in FIG. 3. The link 402 may be used to transmit a response with a request and state information about the request.

The agent 404 implemented by the first component 406 may include a client interface, and the agent 408 implemented by the second component 410 may include a server interface. For example, the first component 406 could be the first processor core 302, and the second component 410 could be the cross bar 306, the cache 308, or the memory controller 310. The client interface of the agent 404 may connect to the server interface of the agent 408 by the link 402. The connected agents 404 and 408 may send and receive messages to one another over point-to-point channels of the link 402, such as one of the Channel A through D implemented by the link 402. For example, the agents 404 and 408 may send and receive messages to perform operations on a shared address space. An operation may include, for example, a change to an address range's data values, permissions, or location in a memory hierarchy. A message may include a set of control and data values sent over a particular channel (e.g., one of the Channel A through D). The channels may be logically independent from one another for communicating the messages. A priority may be specified among the channels, such as a prioritization in which messages on Channel A have a lowest priority with messages on Channel E having a highest priority (e.g., a prioritization of channels A<B<C<D<E for messages across the channels). The channels may contain transaction control signals and a bus for exchanging data (e.g., a physical bus implemented by wires and having a particular data width, such as 128 bits). The channels may be directional, in that each channel may pass messages either from a client interface to a server interface or from a server interface to a client interface.

For example, Channel A may enable the agent having the client interface (e.g., the agent 404) to transmit a request to the agent having the server interface (e.g., the agent 408), such as a request that an operation be performed on a specified address range, such as accessing or caching data, or evicting data with a lower priority (e.g., a low priority evict). Channel B may enable the agent having the server interface (e.g., the agent 408) to transmit a request to the agent having the client interface (e.g., the agent 404), such as a request that an operation be performed at an address cached by a client (e.g., the agent 404), such as for accessing or writing back cached data or probing cached data (e.g., a probe). Channel C may enable the agent having the client interface (e.g., the agent 404) to transmit to the agent having the server interface (e.g., the agent 408) data, an acknowledgment message in response to the request, or evicting data with a higher priority (e.g., a high priority evict). Channel D may enable the agent having the server interface (e.g., the agent 408) to transmit a data response or acknowledgement message back to the client (e.g., the agent 404). Channel E may enable the agent having the client interface (e.g., the agent 404) to transmit back to the agent having the server interface (e.g., the agent 408) a final acknowledgment of a cache line or block transfer from the original requestor (e.g., the agent 404).

Figure 5:
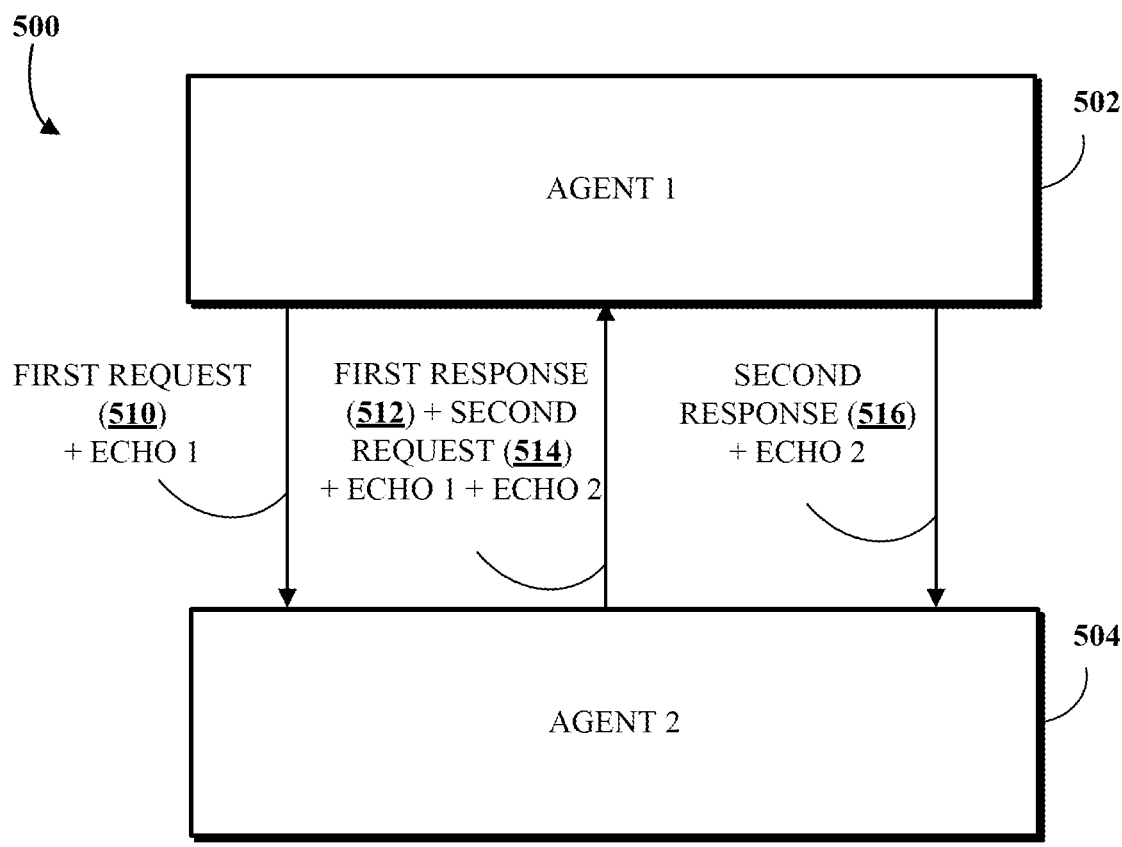
FIG. 5 is a block diagram of an example of a system including an agent transmitting a response with a request and state information about the request.

FIG. 5 is a block diagram of an example of a system 500 including an agent 502 (e.g., "Agent 1") and an agent 504 (e.g., "Agent 2"). The agents 502 and 504 could be agents like the agents shown in FIG. 3. For example, the agent 502 could be implemented by the first processor core 302, and the agent 504 could be implemented by the cross bar 306, the cache 308, the memory controller 310, or the memory-mapped device 312. The agents 502 and 504 may each include circuitry for communicating with one another through a link. For example, the agents 502 and 504 could communicate with one another through a link such as the link 314 shown in FIG. 3, which may be like the link 402 shown in FIG. 4. The agents 502 and 504 could be implemented together in an integrated circuit, such as an SoC.

The agent 502 may be an initiator of an operation (e.g., a client agent, or master), such as an Acquire operation for acquiring access to data stored in a cache block, or an operation to change a permission associated with the cache block (e.g., a state based on the coherence policy, which may enable read or write access). The agent 502 may initiate the operation by transmitting a message (e.g., an Acquire message) including a first request 510 to the agent 504. The first request 510 could be part of the data operation associated with the cache block. The first request 510 may include an address of the cache block. The agent 502 may transmit the first request 510 with a first set of one or more bits (e.g., Echo 1) for tracking information about the first request 510 being sent. The first set of one or more bits may be generated and transmitted by the agent 502, as configured during the integrated circuit generation process, for tracking information about the first request 510 so that the agent 502 does not have to keep state information locally about the first request 510. The agent 502 may transmit the first set of one or more bits (e.g., Echo 1) via a first set of one or more wires between the agents 502 and 504. The first set of one or more wires may be implemented by the SoC specifically for transmitting the state information about the first request 510 in lieu of storing that state information by the agent 504.

The agent 504 may be a responder in the operation (e.g., a server agent, or slave). The agent 504 may receive the first request 510 and the first set of one or more bits (e.g., Echo 1). The agent 504, in turn, may transmit to the agent 502, a message (e.g., a Grant message) including a first response 512 to the first request 510, the first set of one or more bits (e.g., Echo 1, being response echo bits), a second request 514, and a second set of one or more bits (e.g., Echo 2, being request echo bits). For example, the message could be a Grant message responding to the Acquire message. The second request 514 could be a request for an acknowledgment of the Grant message (e.g., an implicit request). The first response 512 might not include the address of the cache block, and the agent 504 might not use the first set of one or more bits (e.g., Echo 1) for any purpose other than to loop them back to the agent 502 (e.g., via the first set of one or more wires). However, the agent 504 may generate and transmit the second set of one or more bits (e.g., Echo 2) for tracking information about the second request 514 so that the agent 504 does not have to keep state information locally about the second request 514. The second set of one or more bits (e.g., Echo 2) may be used by the agent 504 to send information to travel with the second request 514 (e.g., the implicit request for the acknowledgment) and its associated second response 516, rather than the agent 504 tracking outstanding request messages in a local state. The agent 504 may transmit the second set of one or more bits (e.g., Echo 2) via a second set of one or more wires between the agents 502 and 504. The second set of one or more wires may be implemented by the SoC specifically for transmitting the state information about the second request 514 in lieu of storing that state information by the agent 504. Thus, the agent 504 may be transmitting a response (e.g., the first response 512, such as the Grant message) with a request (e.g., the second request 514, being the implicit request for the acknowledgment) and state information about the request (e.g., the second set of one or more bits, Echo 2).

The agent 502 may receive the first response 512 to the first request 510, the first set of one or more bits (e.g., Echo 1), the second request 514, and the second set of one or more bits (e.g., Echo 2). For example, the agent 502 may receive the access to the data stored in the cache block as requested by the agent 502. The agent 502 might not use the second set of one or more bits (e.g., Echo 2) for any purpose other than to loop them back to the agent 504 (e.g., via the second set of one or more wires). However, the agent 502 may use the first set of one or more bits (e.g., Echo 1) that it previously generated to track information about the first request 510 that it previously sent (e.g., the Acquire message). This may enable the agent 502 to process the first response 512 (e.g., which might not include the address of the cache block) based on the information being received. The agent 502, in turn, may transmit to the agent 504, a message (e.g., a GrantAck message) including a second response 516 to the second request 514 and the second set of one or more bits (e.g., Echo 2). For example, the second response 516 could be an acknowledgment of the second request 514. The second response 516 might not include the address of the cache block being acknowledged.

The agent 504 may receive the second response 516 to the second request 514 and the second set of one or more bits (e.g., Echo 2). For example, the agent 504 may receive the acknowledgment, such as the GrantAck message. The agent 504 may use the second set of one or more bits (e.g., Echo 2) that it previously generated to track information about the second request 514 that it previously sent (e.g., the implicit request, with the Grant message). This may enable the agent 504 to process the second response 516 (e.g., which might not include the address of the cache block) based on the information being received, such as for determining success of the transfer to the agent 502. As a result, the agent 504 can avoid keeping state information locally (e.g., sizing a state storage locally, which may involve information to determine a correct concurrency based on the coherence policy) and avoid the complexity of managing associated storage.

Figure 6:
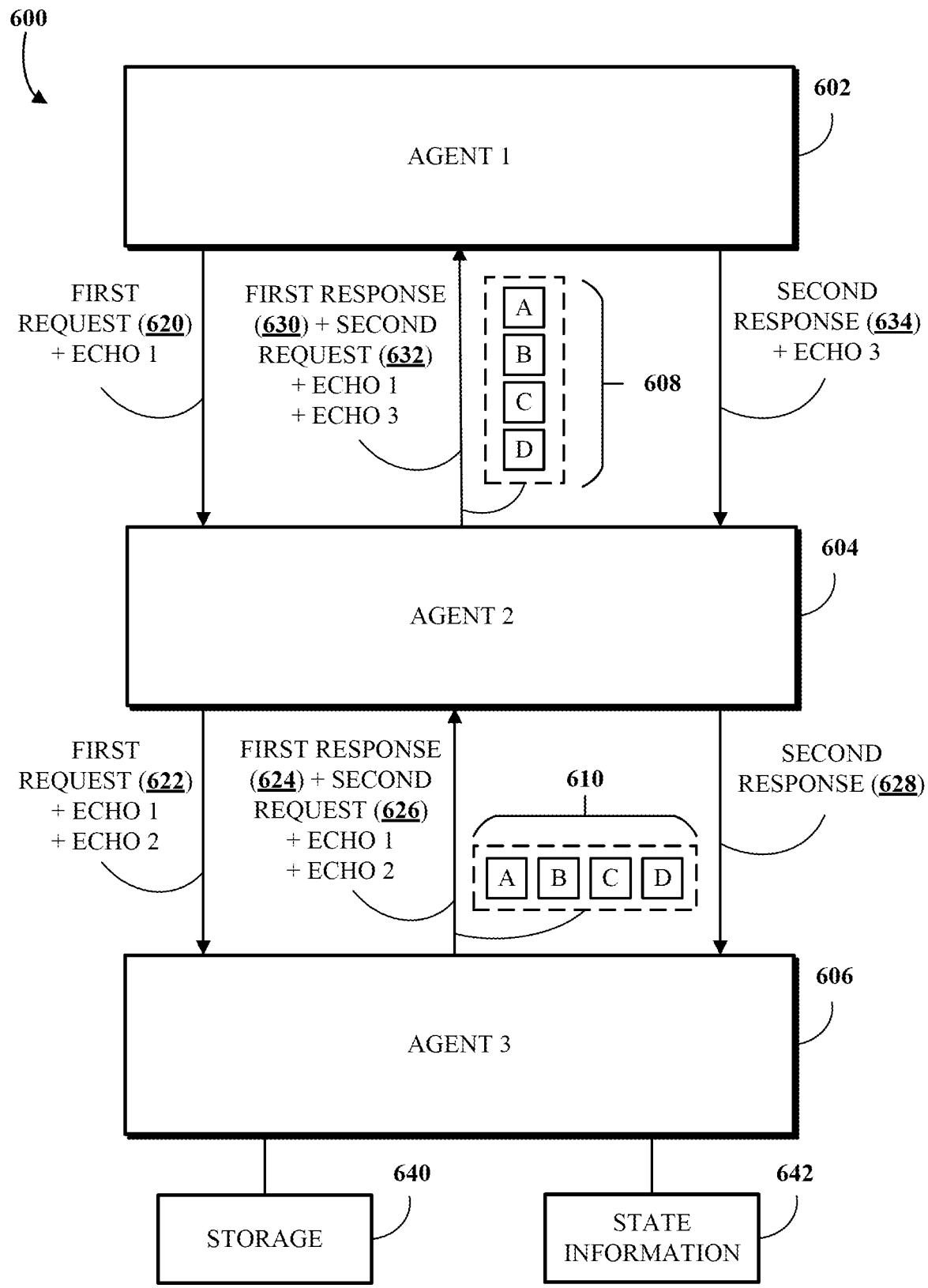
FIG. 6 is a block diagram of an example of a system including an agent transmitting a response with a request and state information about the request for determining a byte order.

FIG. 6 is a block diagram of an example of a system 600 including an agent 602 (e.g., "Agent 1"), an agent 604 (e.g., "Agent 2"), and an agent 606 (e.g., "Agent 3"). The agents 602, 604, and 606 could be agents like the agents shown in FIG. 3. For example, the agent 602 could be implemented by the first processor core 302, the agent 604 could be implemented by the cross bar 306, and the agent 606 could be implemented by the cache 308. The agents 602, 604, and 606 may each include circuitry for communicating with one another through links. For example, the agents 602 and 604 could communicate with one another through a link such as the link 314 shown in FIG. 3, and the agents 604 and 606 could communicate with one another through a link such as the link 318 shown in FIG. 3, each of which may be like the link 402 shown in FIG. 4. The agents 602, 604, and 606 could be implemented together in an integrated circuit, such as an SoC.

The agent 602 may be an initiator of a first operation (e.g., a client agent), such as an Acquire operation for acquiring access to data stored in a cache block, such as data chunks A, B, C, and D stored by the agent 606. The agent 602 may initiate the first operation by transmitting a message (e.g., a first Acquire message in the system 600) including a first request 620 to the agent 604. The first request 620 may include an address of the cache block. The first request 620 to the agent 604 could be a request for the data stored in the cache block (e.g., the data chunks A, B, C, and D) with a priority byte being sent in an earliest clock cycle (e.g., a byte in the data chunk A). The data bus between the agents 602 and 604 may be implemented by a first bus 608 that is a narrower bus (e.g., 128 bits) such that only one data chunk may be transferred per clock cycle (e.g., data chunk A in a first clock cycle, data chunk B in a second clock cycle, data chunk C in a third clock cycle, and data chunk D in a fourth clock cycle). The agent 602 may transmit the first request 620 to the agent 604 with a first set of one or more bits (e.g., Echo 1) for tracking information about the first request 620 being sent (e.g., the request for the data stored in the cache block, the data chunks A, B, C, and D). The first set of one or more bits (e.g., Echo 1) may be generated and transmitted by the agent 602 to the agent 604, as configured during the integrated circuit generation process, for tracking information about the first request 620 to the agent 604 so that the agent 602 does not have to keep state information locally about the first request 620. The agent 602 may transmit the first set of one or more bits (e.g., Echo 1) via a first set of one or more wires between the agents 602 and 604. The first set of one or more wires may be implemented by the SoC specifically for transmitting the state information about the first request 620 in lieu of storing that state information by the agent 602.

The agent 604 may be a responder in the first operation (e.g., a server agent) and an initiator of a second operation (e.g., a client agent) to access the data stored in the cache block (e.g., the data chunks A, B, C, and D) from the agent 606 (e.g., the agent 604 may be a servent). The agent 604 may receive the first request 620 and the first set of one or more bits (e.g., Echo 1) from the agent 602. The agent 604 might not use the first set of one or more bits (e.g., Echo 1) for any purpose other than to loop them back to the agent 602 (e.g., via the first set of one or more wires). The agent 604, in turn, may initiate the second operation by transmitting a message (e.g., a second Acquire message in the system 600) including a first request 622 to the agent 606. The first request 622 to the agent 606 could be a request for the data stored in the cache block (e.g., the data chunks A, B, C, and D), such as in a data storage 640. The first request 622 may include an address of the cache block. The data bus between the agents 604 and 606 may be implemented by a second bus 610 that is a wider bus (e.g., 512 bits) such that more data (e.g., an entire cache block, such as the data chunks A, B, C, and D) may be transferred per clock cycle. Thus, the agent 604 could be a bus width adapter or expander between the agent 602 and the agent 606 (e.g., between the first bus 608 being a narrower bus, such as 128 bits, and the second bus 610 being a wider bus, such as 512 bits). The agent 604 may transmit the first request 622 to the agent 606 with the first set of one or more bits (e.g., Echo 1), along with a second set of one or more bits (e.g., Echo 2) for tracking information about the first request 622 being sent to the agent 606 (e.g., for tracking the request for the byte order, such as the priority byte in the data chunk A to be sent to the agent 602 in an earliest clock cycle). The second set of one or more bits (e.g., Echo 2) may be generated and transmitted by the agent 604 to the agent 606, as configured during the integrated circuit generation process, for tracking information about the first request 622 so that the agent 604 does not have to keep state information locally about the first request 622. The agent 604 may transmit the first set of one or more bits (e.g., Echo 1) and the second set of one or more bits (e.g., Echo 2) via a second set of one or more wires between the agents 604 and 606. The second set of one or more wires may be implemented by the SoC specifically for transmitting the state information about the first request 622 in lieu of storing that state information by the agent 604

The agent 606 may be a responder in the second operation (e.g., a server agent). The agent 606 may receive the first request 622 from the agent 604, the first set of one or more bits (e.g., Echo 1), and the second set of one or more bits (e.g., Echo 2). The agent 606, in turn, may transmit to the agent 604, a message (e.g., a first Grant message in the system 600) including a first response 624, the first set of one or more bits (e.g., Echo 1), the second set of one or more bits (e.g., Echo 2), and a second request 626. The first response 624 might not include the address of the cache block. The first response 624 to the agent 604 could be a transfer of the data stored in the cache block (e.g., the data chunks A, B, C, and D, stored in the data storage 640) via the second bus 610, and the second request 626 to the agent 604 could be a request for an acknowledgment of the transfer (e.g., an implicit request). The agent 606 might not use the first set of one or more bits (e.g., Echo 1) or the second set of one or more bits (e.g., Echo 2) for any purpose other than to loop them back to the agent 604 (e.g., via the second set of one or more wires). Further, the agent 606 might not generate or transmit another set of one or more bits (e.g., Echo 2), instead being configured during the integrated circuit generation process to keep state information locally about the second request 626 to the agent 604, such as in a data structure 642 which may include a score board with a table for tracking requests and responses.

The agent 604 may receive the first response 624 to the first request 622, the first set of one or more bits (e.g., Echo 1), the second set of one or more bits (e.g., Echo 2), and the second request 626. For example, the agent 604 may receive the data stored in the cache block (e.g., the data chunks A, B, C, and D) via the second bus 610. The agent 604 might not use the first set of one or more bits (e.g., Echo 1) for any purpose other than to loop them back to the agent 602 (e.g., via the first set of one or more wires). However, the agent 604 may use the second set of one or more bits (e.g., Echo 2) that it previously generated to track information about the first request 622 that it previously sent to the agent 606 (e.g., for determining a byte order for transmitting data stored in the cache block). This may enable the agent 604 to process the first response 624 (e.g., which might not include the address of the cache block) and the second request 626 from the agent 606 based on the information being received (e.g., for later ordering the data for transfer, so that the priority byte in the data chunk A can be sent to the agent 602 in an earliest clock cycle). The agent 604, in turn, may transmit to the agent 606, a message (e.g., a first GrantAck message in the system 600) including a second response 628 to the second request 626. For example, the second response 628 could be an acknowledgment of the second request 626, acknowledging receipt of the data stored in the cache block, transferred via the second bus 610. The second response 628 might not include the address of the cache block being acknowledged.

The agent 606 may receive the second response 628 from the agent 604. For example, the agent 606 may receive the acknowledgment, indicating success of the transfer. The agent 606 may reference state information stored locally to correlate the second response 628 to the second request 626. This may enable the agent 606 to process the second response 628 (e.g., which might not include the address of the cache block) based on the information stored locally, such as for determining success of the transfer to the agent 604. This may also complete the second operation.

Further, the agent 604 may transmit to the agent 602 a message (e.g., a second Grant message in the system 600) including a first response 630 to the first request 620, the first set of one or more bits (e.g., Echo 1), a second request 632, and a third set of one or more bits (e.g., Echo 3). The first response 630 might not include the address of the cache block. The first response 630 to the agent 602 could be a transfer of the data stored in the cache block (e.g., the data chunks A, B, C, and D) via the first bus 608, received from the agent 606, and the second request 632 to the agent 602 could be a request for an acknowledgment of the transfer (e.g., an implicit request). The agent 604 might not use the first set of one or more bits (e.g., Echo 1) for any purpose other than to loop them back to the agent 604. However, the agent 604 may use the second set of one or more bits (e.g., Echo 2) to process the first response 630 to the first request 620. For example, the agent 604 may use the second set of one or more bits (e.g., Echo 2) to determine the byte order for transmitting data stored in the cache block (e.g., that agent 602 requested the priority byte in the data chunk A to be sent to the agent 602 in an earliest clock cycle), and to transfer the data via the first bus 608 accordingly. The agent 604 does not have to transmit the second set of one or more bits (e.g., Echo 2) to the agent 602. However, the agent 604 may generate and transmit the third set of one or more bits (e.g., Echo 3) for tracking information about the second request 632 so that the agent 604 does not have to keep state information locally about the second request 632. The third set of one or more bits (e.g., Echo 3) may be used by the agent 604 to send information to travel with the second request 632 (e.g., the implicit request for the acknowledgment) and its associated second response 634, rather than the agent 604 tracking outstanding request messages in a local state. The agent 604 may transmit the third set of one or more bits (e.g., Echo 3) via a third set of one or more wires between the agents 602 and 604. The third set of one or more wires may be implemented by the SoC specifically for transmitting the state information about the second request 632 in lieu of storing that state information by the agent 604. Thus, the agent 604 may be transmitting a response (e.g., the first response 630, such as the data transfer) with a request (e.g., the second request 632, being the implicit request for the acknowledgment) and state information about the request (e.g., the third set of one or more bits, Echo 3).

The agent 602 may receive the first response 630 to the first request 620, the first set of one or more bits (e.g., Echo 1), the second request 632, and the third set of one or more bits (e.g., Echo 3). For example, the agent 602 may receive the access to data stored in the cache block, such as data chunks A, B, C, and D, with the priority byte (e.g., a byte in the data chunk A) arriving in an earliest clock cycle, as requested by the agent 602. The agent 602 might not use the third set of one or more bits (e.g., Echo 3) for any purpose other than to loop them back to the agent 604 (e.g., via the third set of one or more wires). However, the agent 602 may use the first set of one or more bits (e.g., Echo 1) that it previously generated to track information about the first request 620 that it previously sent (e.g., the request to acquire access to data stored in the cache block, with the priority byte being sent in an earliest clock cycle). This may enable the agent 602 to process the first response 630 (e.g., which might not include the address of the cache block) based on the information being received. The agent 602, in turn, may transmit to the agent 604, a message (e.g., a second GrantAck message in the system 600) including a second response 634 to the second request 632 and the third set of one or more bits (e.g., Echo 3). For example, the second response 634 could be an acknowledgment of the second request 632, acknowledging receipt of the data stored in the cache block, transferred via the first bus 608. The second response 634 might not include the address of the cache block being acknowledged.

The agent 604 may receive the second response 634 to the second request 632 and the third set of one or more bits (e.g., Echo 3). For example, the agent 604 may receive the acknowledgment, indicating success of the transfer. The agent 604 may use the third set of one or more bits (e.g., Echo 3) that it previously generated to track information about the second request 632 that it previously sent (e.g., the implicit request). This may enable the agent 604 to process the second response 634 (e.g., which might not include the address of the cache block) based on the information being received, such as for determining success of the transfer to the agent 602. As a result, the agent 604 can avoid keeping state information locally (e.g., sizing a state storage locally, like the data structure 640, which may involve information to determine a correct concurrency based on the coherence policy) and avoid the complexity of managing associated storage. This may also complete the first operation.

Figure 7:
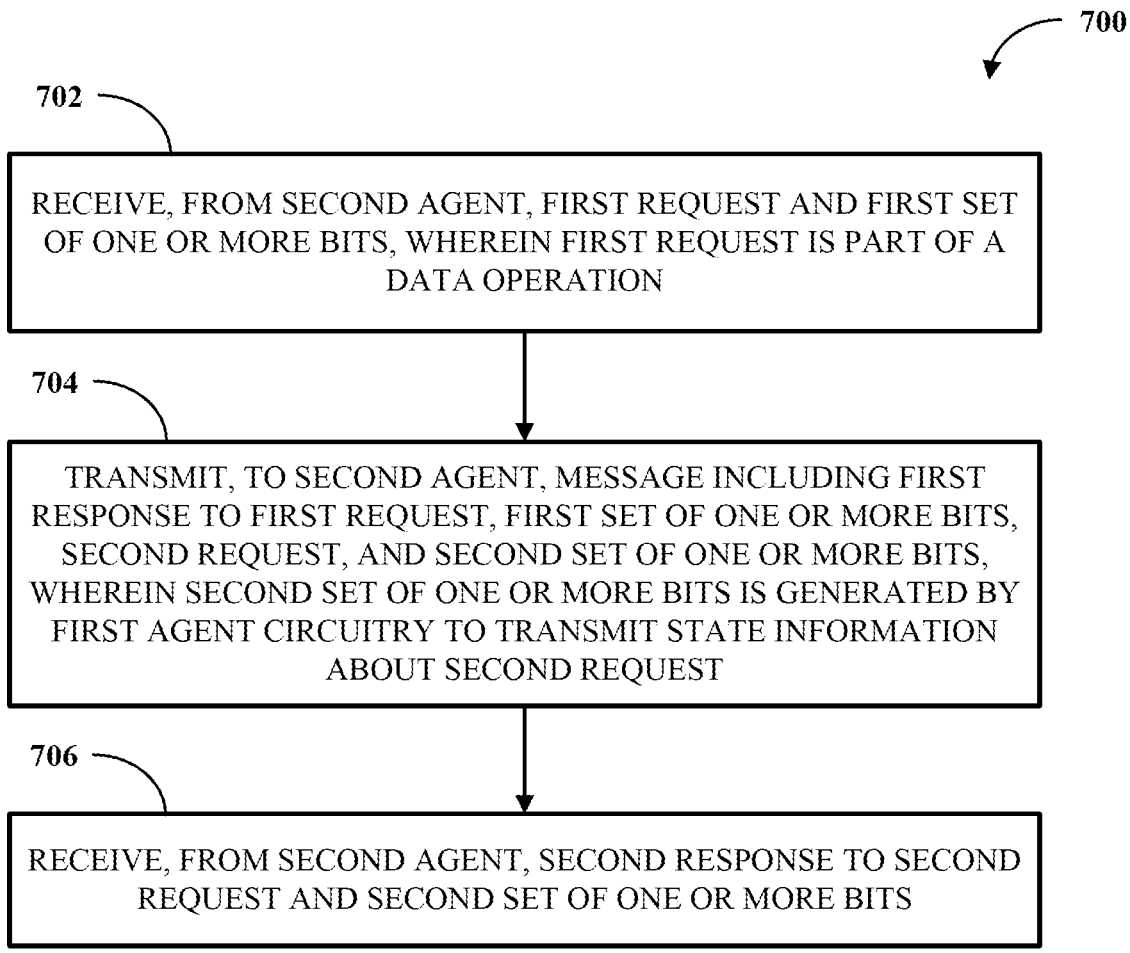
FIG. 7 is a flow chart of an example of a technique for transmitting a response with a request and state information about the request.

To further describe some implementations in greater detail, reference is next made to examples of techniques which may be performed by or using a system for transmitting a response with a request and state information about the request. FIG. 7 is a flow chart of an example of a technique 700 for transmitting a response with a request and state information about the request. The technique 700 can be executed using computing devices, such as the systems, hardware, and software described with respect to FIGS. 1-6. For simplicity of explanation, the technique 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 702, first agent circuitry (e.g., circuitry implemented by the agent 504 or circuitry implemented by the agent 604) may receive, from a second agent (e.g., the agent 502, the agent 602), a first request and a first set of one or more bits. For example, circuitry implemented by the agent 504 may receive from the agent 502 the first request 510 and the first set of one or more bits (e.g., Echo 1). In another example, circuitry implemented by the agent 604 may receive from the agent 602 the first request 620 and the first set of one or more bits (e.g., Echo 1). The first request may be part of a data operation, which may be associated with a cache block. For example, the first agent circuitry could receive an Acquire message requesting access to the cache block. For example, the first request could be a request for access to the data chunks A, B, C, and D shown in FIG. 6, with a priority byte being sent in an earliest clock cycle (e.g., a byte in the data chunk A). In another example, the data operation could include a change to a permission associated with the cache block (e.g., a state based on the coherence policy, which may enable read or write access).

The first set of one or more bits (e.g., Echo 1) may be generated and transmitted by the second agent, as configured during an integrated circuit generation process, for tracking information about the first request so that the second agent does not have to keep state information locally about the first request. The second agent may transmit the first set of one or more bits via a first set of one or more wires between second agent the first agent circuitry and the second agent. The first set of one or more wires may be implemented in an SoC specifically for transmitting the state information about the first request in lieu of storing that state information by the second agent.

At 704, the first agent circuitry may transmit, to the second agent, a message including a first response to the first request, the first set of one or more bits, a second request (e.g., an implicit request), and a second set of one or more bits. For example, the first agent circuitry may transmit, to the second agent, a Grant message including the first response to the first request, the first set of one or more bits, the second request, and the second set of one or more bits. The second set of one or more bits may be generated by the first agent circuitry to transmit state information about the second request. For example, circuitry implemented by the agent 504 may transmit to the agent 502, the first response 512 to the first request 510, the first set of one or more bits (e.g., Echo 1), the second request 514, and the second set of one or more bits (e.g., Echo 2). The second set of one or more bits (e.g., Echo 2) may be generated by the circuitry implemented by the agent 504 to transmit state information about the second request 514. In another example, circuitry implemented by the agent 604 may transmit to the agent 602 the first response 630 to the first request 620, the first set of one or more bits (e.g., Echo 1), the second request 632, and the third set of one or more bits (e.g., Echo 3). In this case, the third set of one or more bits (e.g., Echo 3) may be a second set to the first set of one or more bits (e.g., Echo 1). The third set of one or more bits (e.g., Echo 3) may be generated by the circuitry implemented by the agent 604 to transmit state information about the second request 632.

The second set of one or more bits (e.g., Echo 2 or Echo 3) may be generated and transmitted by the first agent circuitry, as configured during an integrated circuit generation process, for tracking information about the second request so that the first agent circuitry does not have to keep state information locally about the second request. The first agent circuitry may transmit the second set of one or more bits via a second set of one or more wires between the first agent circuitry and the second agent. The second set of one or more wires may be implemented by the SoC specifically for transmitting the state information about the second request in lieu of storing that state information by the first agent circuitry.

At 706, the first agent circuitry may receive, from the second agent, a second response (e.g., an acknowledgement) to the second request and the second set of one or more bits. For example, the first agent circuitry could receive a GrantAck message including the second response to the second request and the second set of one or more bits. For example, circuitry implemented by the agent 504 may receive from the agent 502, the second response 516 to the second request 514 and the second set of one or more bits (e.g., Echo 2). In another example, circuitry implemented by the agent 604 may receive from the agent 602, the second response 634 to the second request 632 and the third set of one or more bits (e.g., Echo 3). The second set of one or more bits may enable the first agent circuitry to process the second response based on the information being received from the second agent (e.g., without keep state information locally about the second response). For example, the first agent circuitry may use the second set of one or more bits to determine a byte order for transmitting data stored in the cache block (e.g., the data chunks A, B, C, and D, with a priority byte in the data chunk A being sent in an earliest clock cycle). The second response may complete the operation.

Figure 8:
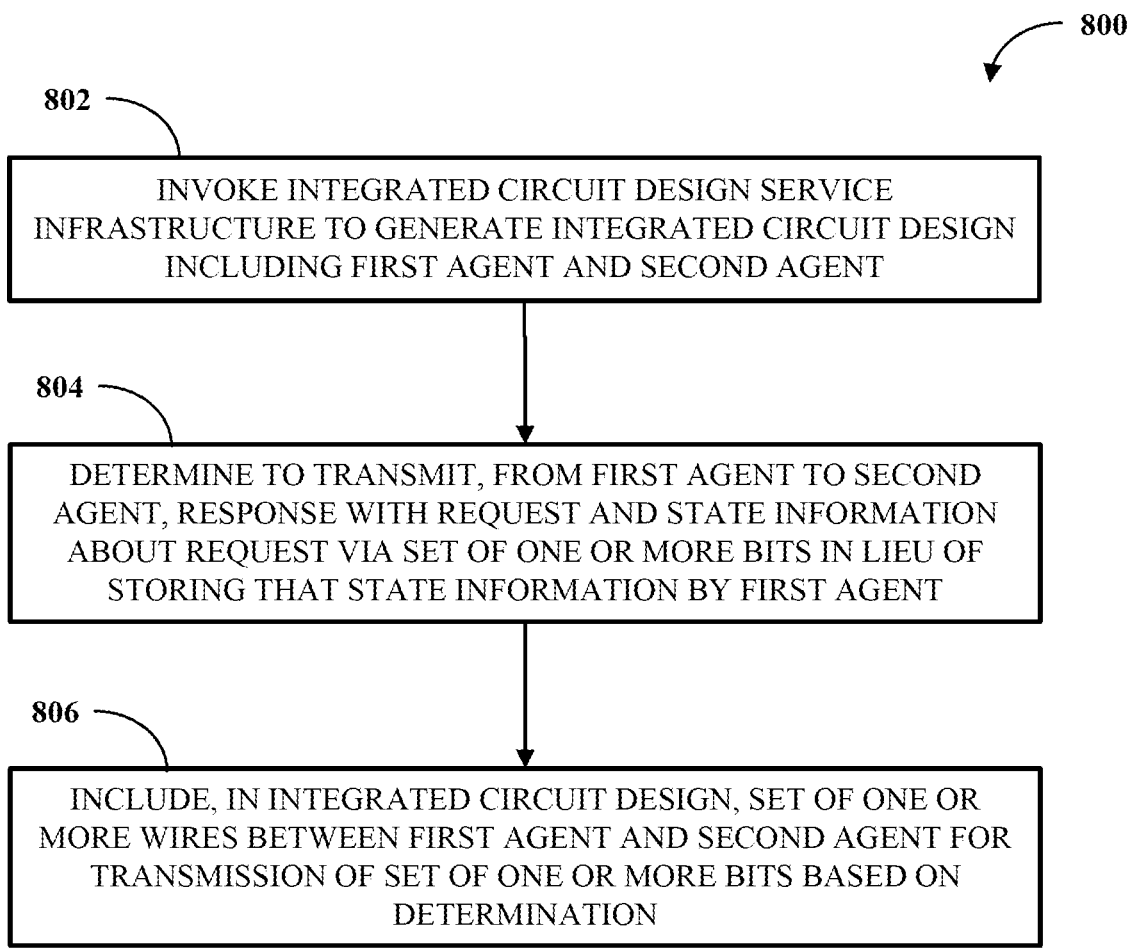
FIG. 8 is a flow chart of an example of a technique for generating an integrated circuit design that transmits a response with a request and state information about the request.

FIG. 8 is a flow chart of an example of a technique 800 for generating an integrated circuit design that transmits a response with a request and state information about the request. The technique 800 can be executed using computing devices, such as the systems, hardware, and software described with respect to FIGS. 1-6. For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a system (e.g., the system 200) may invoke an integrated circuit design service infrastructure (e.g., the integrated circuit design service infrastructure 110) to generate an integrated circuit design (e.g., a circuit representation) including a first agent and a second agent. Invoking the integrated circuit design service infrastructure may be part of an integrated circuit generation process for designing an integrated circuit, such as an the SoC. For example, the integrated circuit design service infrastructure may include a RTL service module configured to generate an RTL data structure for the integrated circuit based on a design parameters data structure. For example, the RTL service module may be implemented as Scala code. For example, the RTL service module may be implemented using Chisel. For example, the RTL service module may be implemented using FIRRTL and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a JSON file) as input and output an RTL data structure (e.g., a Verilog file) for the chip.

At 804, the integrated circuit design service infrastructure may determine the first agent to transmit to the second agent, a response with a request and state information about the request via a set of one or more bits. The integrated circuit design service infrastructure may determine that the first agent may transmit state information about the request in lieu of storing that state information by the first agent. For example, the integrated circuit design service infrastructure may determine the agent 504 may transmit to the agent 502 the first response 512 to the first request 510, the first set of one or more bits (e.g., Echo 1), the second request 514, and the second set of one or more bits (e.g., Echo 2) for tracking state information about the second request 514. The integrated circuit design service infrastructure may determine that the agent 504 may transmit the second set of one or more bits (e.g., Echo 2) in lieu of storing the state information by the agent 504. In another example, the integrated circuit design service infrastructure may determine the agent 604 may transmit to the agent 602 the first response 630 to the first request 620, the first set of one or more bits (e.g., Echo 1), the second request 632, and the third set of one or more bits (e.g., Echo 3) for tracking state information about the second request 632. The integrated circuit design service infrastructure may determine that the agent 604 may transmit the third set of one or more bits (e.g., Echo 3) in lieu of storing the state information by the agent 604. In this case, the third set of one or more bits (e.g., Echo 3) may be a second set to the first set of one or more bits (e.g., Echo 1). The integrated circuit design service infrastructure may include a negotiation process (e.g., implemented by Diplomacy) that considers both request echo bits (e.g., the first set of one or more bits, such as Echo 1) and response echo bits (e.g., the second or third sets of one or more bits, such as Echo 2 or Echo 3).

At 806, the integrated circuit design service infrastructure may include in the integrated circuit design a set of one or more wires between the first agent and the second agent for transmission of the set of one or more bits based on the determination. The set of one or more wires may be included in the integrated circuit design specifically for transmitting the state information about the second request. The set of one or more wires may be implemented in an integrated circuit, such as an SoC, based on the integrated circuit design, for transmitting the state information about the second request. For example, the negotiation process may generate wires specifically to transmit the request echo bits (e.g., the first set of one or more bits, such as Echo 1) and response echo bits (e.g., the second or third sets of one or more bits, such as Echo 2 or Echo 3). This may enable a choice during the integrated circuit design process between: (1) the first agent locally managing state information to track request messages, and (2) the first agent moving the tracking to outside of the agent by using the echo bits to manage the state information. As a result, the complexity of an agent that sends response messages and request messages can be reduced so that the agents can operate more efficiently in the system.

Some implementations may include a method including: receiving, by first agent circuitry, from a second agent, a first request and a first set of one or more bits, wherein the first request is part of a data operation; transmitting, by the first agent circuitry, to the second agent, a message including a first response to the first request, the first set of one or more bits, a second request, and a second set of one or more bits, wherein the second set of one or more bits is generated by the first agent circuitry to transmit state information about the second request; and receiving, by the first agent circuitry, from the second agent, a second response to the second request and the second set of one or more bits. In some implementations, the method may include transmitting the second set of one or more bits via a set of one or more wires between the first agent circuitry and the second agent, wherein the set of one or more wires is included with the first agent circuitry in an integrated circuit to transmit the state information in lieu of storing that state information by the first agent circuitry. In some implementations, the second request is an implicit request, and the second response is an acknowledgement. In some implementations, the method may include using the second set of one or more bits to determine a byte order for transmitting data stored in a cache block. In some implementations, the data operation includes a change to a permission associated with a cache block. In some implementations, the method may include implementing the first agent circuitry in at least one of a cross bar, a cache, a memory controller, or a memory-mapped device, and implementing the second agent in a processor core. In some implementations, the first request is a request for transmission of data stored in a cache block and the first response is a transmission of data stored in the cache block. In some implementations, the message is transmitted via a point to point link between the first agent circuitry and the second agent. In some implementations, the message is a Grant message.

Some implementations may include an apparatus including: first agent circuitry configured to: receive, from a second agent, a first request and a first set of one or more bits, wherein the first request is part of a data operation; transmit, to the second agent, a message including a first response to the first request, the first set of one or more bits, a second request, and a second set of one or more bits, wherein the second set of one or more bits is generated by the first agent circuitry to transmit state information about the second request; and receive, from the second agent, a second response to the second request and the second set of one or more bits. In some implementations, the apparatus may include a set of one or more wires between the first agent circuitry and the second agent for transmission of the second set of one or more bits, wherein the set of one or more wires is included with the first agent circuitry in an integrated circuit to transmit the state information in lieu of storing that state information by the first agent circuitry. In some implementations, the second request is an implicit request, and the second response is an acknowledgement. In some implementations, the first agent circuitry uses the second set of one or more bits to determine a byte order for transmitting data stored in a cache block. In some implementations, the data operation includes a change to a permission associated with a cache block In some implementations, the first agent circuitry is implemented in at least one of a cross bar, a cache, a memory controller, or a memory-mapped device, and the second agent is implemented in a processor core. In some implementations, the first request is a request for transmission of data stored in a cache block and the first response is a transmission of data stored in the cache block.

Some implementations may include a non-transitory computer readable medium comprising a circuit representation that, when processed by a computer, is used to program or manufacture an integrated circuit including: first agent circuitry that: receives, from a second agent, a first request and a first set of one or more bits, wherein the first request is part of a data operation; transmits, to the second agent, a message including a first response to the first request, the first set of one or more bits, a second request, and a second set of one or more bits, wherein the second set of one or more bits is generated by the first agent circuitry to transmit state information about the second request; and receives, from the second agent, a second response to the second request and the second set of one or more bits. In some implementations, the integrated circuit further comprises a set of one or more wires between the first agent circuitry and the second agent for transmission of the second set of one or more bits, wherein the set of one or more wires is included in the integrated circuit based on a determination to transmit the state information in lieu of storing that state information by the first agent circuitry, the determination made by the computer when processing the circuit representation. In some implementations, the second request is an implicit request, and the second response is an acknowledgement. In some implementations, the first agent circuitry uses the second set of one or more bits to determine a byte order for transmitting data stored in a cache block. In some implementations, the data operation includes a change to a permission associated with a cache block. In some implementations, the integrated circuit implements the first agent circuitry in at least one of a cross bar, a cache, a memory controller, or a memory-mapped device and implements the second agent in a processor core. In some implementations, the first request is a request for transmission of data stored in a cache block and the first response is a transmission of data stored in the cache block Some implementations may include a method including generating an integrated circuit design for an integrated circuit, wherein the integrated circuit design includes a first agent configured to perform the steps of: receiving, from a second agent, a first request and a first set of one or more bits, wherein the first request is part of a data operation; transmitting, to the second agent, a message including a first response to the first request, a first set of one or more bits, a second request, and a second set of one or more bits, wherein the second set of one or more bits is generated by the first agent to transmit state information about the second request; and receiving, from the second agent, a second response to the second request and the second set of one or more bits. In some implementations, the method may include determining to transmit the state information in lieu of storing that state information by the first agent; and including, in the integrated circuit, a set of one or more wires between the first agent and the second agent for transmission of the second set of one or more bits based on the determination. In some implementations, the method may include implementing the first agent in at least one of a cross bar, a cache, a memory controller, or a memory-mapped device, and implementing the second agent in a processor core.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A method comprising:
   receiving, by first agent circuitry, from a second agent, a first request and a first set of one or more bits, wherein the first request is part of a data operation;
   transmitting, by the first agent circuitry, to the second agent, a message including a first response to the first request, the first set of one or more bits, a second request, and a second set of one or more bits, wherein the second set of one or more bits is generated by the first agent circuitry to transmit state information about the second request; and
   receiving, by the first agent circuitry, from the second agent, a second response to the second request and the second set of one or more bits.

2. The method of claim 1, further comprising:
   transmitting the second set of one or more bits via a set of one or more wires between the first agent circuitry and the second agent, wherein the set of one or more wires is included with the first agent circuitry in an integrated circuit to transmit the state information in lieu of storing that state information by the first agent circuitry.

3. The method of claim 1, wherein the second request is an implicit request, and the second response is an acknowledgement.

4. The method of claim 1, further comprising:
   using the second set of one or more bits to determine a byte order for transmitting data stored in a cache block.

5. The method of claim 1, wherein the data operation includes a change to a permission associated with a cache block.

6. The method of claim 1, further comprising:
   implementing the first agent circuitry in at least one of a cross bar, a cache, a memory controller, or a memory-mapped device, and implementing the second agent in a processor core.

7. The method of claim 1, wherein the first request is a request for transmission of data stored in a cache block and the first response is a transmission of data stored in the cache block.

8. The method of claim 1, wherein the message is transmitted via a bus implemented by a point to point link between the first agent circuitry and the second agent.

9. The method of claim 1, wherein the message is a Grant message.

10. An apparatus comprising:
    first agent circuitry configured to:

receive, from a second agent, a first request and a first set of one or more bits, wherein the first request is part of a data operation;

transmit, to the second agent, a message including a first response to the first request, the first set of one or more bits, a second request, and a second set of one or more bits, wherein the second set of one or more bits is generated by the first agent circuitry to transmit state information about the second request; and receive, from the second agent, a second response to the second request and the second set of one or more bits.

11. The apparatus of claim 10, further comprising:
a set of one or more wires between the first agent circuitry and the second agent for transmission of the second set of one or more bits, wherein the set of one or more wires is included with the first agent circuitry in an integrated circuit to transmit the state information in lieu of storing that state information by the first agent circuitry.

12. The apparatus of claim 10, wherein the second request is an implicit request, and the second response is an acknowledgement.

13. The apparatus of claim 10, wherein the first agent circuitry uses the second set of one or more bits to determine a byte order for transmitting data stored in a cache block.

14. The apparatus of claim 10, wherein the data operation includes a change to a permission associated with a cache block.

15. The apparatus of claim 10, wherein the first agent circuitry is implemented in at least one of a cross bar, a cache, a memory controller, or a memory-mapped device, and the second agent is implemented in a processor core.

16. The apparatus of claim 10, wherein the first request is a request for transmission of data stored in a cache block and the first response is a transmission of data stored in the cache block.

17. A non-transitory computer readable medium comprising a circuit representation that, when processed by a computer, is used to program or manufacture an integrated circuit comprising:

first agent circuitry that:
receives, from a second agent, a first request and a first set of one or more bits, wherein the first request is part of a data operation;

transmits, to the second agent, a message including a first response to the first request, the first set of one or more bits, a second request, and a second set of one or more bits, wherein the second set of one or more bits is generated by the first agent circuitry to transmit state information about the second request; and receives, from the second agent, a second response to the second request and the second set of one or more bits.

18. The non-transitory computer readable medium of claim 17, wherein the integrated circuit further comprises a set of one or more wires between the first agent circuitry and the second agent for transmission of the second set of one or more bits, wherein the set of one or more wires is included in the integrated circuit based on a determination to transmit the state information in lieu of storing that state information by the first agent circuitry, the determination made by the computer when processing the circuit representation.

19. The non-transitory computer readable medium of claim 17, wherein the second request is an implicit request, and the second response is an acknowledgement.

20. The non-transitory computer readable medium of claim 17, wherein the first agent circuitry uses the second set of one or more bits to determine a byte order for transmitting data stored in a cache block.

\* \* \* \* \*